United States Patent [19]
Lee

[11] Patent Number: 6,084,726
[45] Date of Patent: Jul. 4, 2000

[54] OPTICAL PICKUP ACTUATOR FOR BOTH A COMPACT DISC AND A DIGITAL VIDEO DISC

[75] Inventor: Kwan-Chul Lee, Koyang-Si, Rep. of Korea

[73] Assignee: Daewoo Electronics Co., Ltd., Seoul, Rep. of Korea

[21] Appl. No.: 09/199,354

[22] Filed: Nov. 25, 1998

[30] Foreign Application Priority Data

Nov. 25, 1997 [KR] Rep. of Korea ............. 97-62557

[51] Int. Cl.[7] .................................................... G02B 7/02
[52] U.S. Cl. ..................... 359/824; 359/813; 369/44.22
[58] Field of Search ................................. 359/813, 814, 359/823, 824; 369/112, 44.22

[56] References Cited

U.S. PATENT DOCUMENTS

| | | | |
|---|---|---|---|
| 4,687,296 | 8/1987 | Terayama et al. | 359/814 |
| 4,861,138 | 8/1989 | Suzuki | 359/814 |
| 4,998,802 | 3/1991 | Kasuga et al. | 359/814 |
| 5,132,850 | 7/1992 | Hagiwara | 359/813 |
| 5,506,732 | 4/1996 | Mori | 359/824 |
| 5,659,525 | 8/1997 | Miyamae et al. | 369/44.22 |
| 5,687,154 | 11/1997 | Tsuchiya et al. | 369/112 |
| 5,815,328 | 9/1998 | Makita | 359/824 |
| 5,825,561 | 10/1998 | Ohguri | 359/822 |

*Primary Examiner*—Loha Ben
*Attorney, Agent, or Firm*—Jacobson, Price, Holman & Stern, PLLC

[57] ABSTRACT

A yoke includes a shaft upwardly protruding from the bottom and a plurality of magnets mounted at a certain interval along the inner periphery surface of the yoke. A lens holder is movably connected with the yoke through the shaft, and has a plurality of winding coils at positions opposite to the plurality of magnets respectively. At least two laser openings are formed in the lens holder in parallel with a laser beam axis direction. Lens containing portions are formed on upper portions of the laser openings in order for an objective lens for the compact disc(CD) and an objective lens for the digital video disc(DVD) to be accommodated. Each of the plurality of magnets is formed in a two-body type. The plurality of magnets are constituted with a plurality of first magnets polarized in parallel with the laser beam axis direction and a plurality of second magnets polarized perpendicular with the laser beam axis direction, the first magnets and the second magnets are alternately mounted.

2 Claims, 8 Drawing Sheets

OPTICAL PICKUP ACTUATOR FOR BOTH A COMPACT DISC AND A DIGITAL VIDEO DISC

BACKGROUND OF THE INVENTION

1. Field of the Invention

The present invention relates to an optical pickup actuator, and more particularly to an optical pickup actuator having a lens holder of a high resonance frequency.

2. Description of the Prior Art

Recently, a data retrieving/recording system has been developed which uses an optical disc such as a laser disc or a compact disc. For retrieving or recording information from or to an optical disc, an optical pickup actuator is provided to irradiate a laser beam along a track on the optical disc and to retrieve data based on a reflected beam from the track. If a track is spirally formed on an optical disc, sectors formed on the track have different distances from the center of the optical disc due to eccentricity of the track. Accordingly, a tracking control is required to precisely irradiate a laser beam on a track in a retrieving mode. Further, a distance between an optical pickup actuator and an optical disc minutely fluctuates since the optical disc is rotated in the retrieving mode. Such distance fluctuation causes difficulty in precisely retrieving data, so that a focusing control is essential.

For the focusing control, a focusing error is detected from a laser beam reflected by an optical disk so as to produce a focus error signal. The focus error signal drives the objective lens for performing a focusing control operation. In general, the objective lens is supported and fixed by a spring on an optical head housing. A focusing actuator is operated which has a coil for the objective lens to be driven in an axial direction and in an up-and-down direction of a disc.

In the meantime, as a reproducing optical disc dealing with multimedia information, a CD-ROM and the like have been put to practical use. A CD-ROM is a medium having a diameter of 12 cm, a thickness of 1.2 mm, and a track pitch of 1.6 μm, on one side of which information data of 540 MBytes can be stored. In recent years, development of a digital video disc(DVD) having video information recorded on the CD-ROM using an image compression data technology such as an MPEG (Moving Picture Experts Group) has been remarkable.

In order to carry out reproduction on a disc having a high recording density, the spot diameter of a laser beam must be diaphragmed. To do so, it is considered that the wavelength of a laser of an optical pickup device should be shortened(for example, approximately 635 nm), and that the numerical aperture(NA) of an objective lens is made large(for example, approximately 0.6). However, the aberration by inclination of a disc increases in direct proportion to the cube of the numerical aperture of the objective lens. Therefore, making the numerical aperture of the objective lens too large causes decrease of an inclination margin of the disc. Under the condition of the same numerical aperture of an objective lens, the SD specified disc having a thickness of approximately 0.6 mm which is announced as DVD has an inclination margin two times as large as that of a conventional CD having a thickness of approximately 1.2 mm, for example.

In spite of the above requirements, coexistence of a disc having a standard density and a thickness of approximately 1.2 mm(CD, CD-ROM) and a disc having a high density and a thickness of approximately 0.6 mm(DVD) is expected. Therefore, an optical pickup device which can reproduce information recorded on both the CD and the DVD is desired.

A conventional optical pickup actuator for both CD and CVD discs will be hereinafter described with reference to FIGS. 1–4.

FIG. 1 is an exploded perspective view of a conventional optical pickup actuator of an axial slide type for both the CD and the DVD disc, FIG. 2 is a view vertically cross-sectioned along a line II—II of FIG. 1, FIG. 3 is a perspective view of a magnet mounted in the conventional optical pickup actuator of an axial slide type for both the CD and the DVD of FIG. 1, and FIG. 4 is another exploded perspective view of the conventional optical pickup actuator of an axial slide type for both the CD and the DVD.

As shown in FIGS. 1–3, the conventional optical pickup actuator of an axial slide type for both the CD and the DVD is constituted with a cylindrical lens holder 110, lens containers 113 and 115, winding coils 120, a cylindrical yoke 130, a shaft 135, a first magnet pair 140, and a second magnet pair 150. The shaft 135 protrudes upwardly from the bottom of the yoke 130. The first magnet pair 140 is disposed along the inner surface of the yoke 130. The second magnet pair 150 is also disposed along the inner surface of the yoke 130 perpendicular to the first magnet pair 140.

The lens holder 110 has the winding coils 120 on the periphery thereof each of which corresponds to the first and the second magnet pair 140 and 150. The lens containers 113 and 115 each protrude from the upper surface of the lens holder 110. An objective lens 112 for the CD and an objective lens 114 for the DVD are mounted in the lens containers 113 and 115, respectively. Guiding grooves 117 are formed on the periphery of the lens holder 110 directly under the lens containers 113 and 115. The guiding grooves 117 are formed along the laser beam direction so that the guiding grooves 117 are selectively aligned with a through-hole 119 formed in the bottom of the yoke 130, through which a laser beam passes.

The lens holder 110 has an axial hole 118 into which the shaft 135 is inserted. The lens holder 110 is lifted up from the bottom of the yoke 130 by a force resulting from interaction between the first and the second magnet 140 and 150. The magnetizable material is mounted in the center portion of the winding coils 120 which are placed on the periphery of the lens holder 110.

The lens containers 113 and 115 protrude in the axial direction of the objective lens 112 and 114 and on one side of the upper surface of the lens holder 110. Accordingly, the resonance frequency of the lens holder 110 becomes low due to weight of the lens holder 110. The low resonance frequency results in a drawback in that the actuator is easily influenced by a parasitic resonance and outer disturbance with ease. The objective lens 112 and 114 are selectively aligned with the laser beam axis as the lens holder 110 is rotated. The first and second magnet pair 140 and 150 are mounted to serve the movement of the lens holder 110 while preventing the lens containers 113 and 115 from moving. The height of the yoke 130 is higher than the sum of the heights L1 and H1 in order for the lens holder 110 and the objective lens 114 to be protected, wherein reference numeral L1 denotes the height of the second magnet 150 and reference numeral H1 denotes the height from the second magnet 150 to the lens container 115. Accordingly, since the optical pickup actuator becomes larger, the size of the optical pickup actuator can not be minimized.

Further, the height of the yoke 130 is closely related to the structure of the second magnet 150 as shown in FIG. 3. The second magnet 150 is shown in FIG. 3, and the same is applied to the first magnet 140. That is, a magnet M1 made of NdFe is magnetized into N pole and S pole. Non-magnetized region m is formed between the N pole and the S pole. No magnetic field can be generated in the non-magnetized region m. Accordingly, in order to obtain a magnetic field necessary for moving the lens holder 110, the magnet M1 must be lengthened by the length of the non-magnetized region, so that the height of the yoke 130 is higher and the radius of the yoke 130 is longer. Therefore, the size of the optical pickup actuator can not be minimized.

FIG. 4 is another exploded perspective view of the conventional optical pickup actuator of an axial slide type for both the CD and the DVD. The optical pickup actuator has a cylinder 210 on which focusing coil FA and tracking coil pair TRa and TRb are located. A rectangular lens holder 220 is formed on the upper surface of the cylinder 210. Lens containers on one side of the upper surface of the lens holder 220 upwardly protrude in which a DVD objective lens La and the CD objective lens Lb are mounted. The lens containers include a first lens container 222 and a second lens container 224. A balance member 226 is mounted on the lens holder 220 opposite to the lens containers 222 and 224 so that the lens holder 220 can be balanced. An axial hole 228 is formed on the weight center of the lens holder 220 in alignment with the center of the cylinder 210. The axial hole 228 is connected to a shaft 232 protruding in parallel with the axial direction from the center of the yoke 230, so that the cylinder 210 is connected to the yoke 230. Protrusions 234 are formed from the yoke 230 between the shaft 232 and the cylinder 210 and in parallel with the axial direction. The inner periphery of the yoke 230 corresponding to the periphery of the cylinder 210 has a pair of magnets 236 in an electromagnetic interaction with the focusing coil FA and a tracking coil pair TRa and TRb.

In the optical pickup actuator as shown in FIG. 4, the lens holder 220 is rotated on the upper surface of the yoke 230, and the lens containers 222 and 224 protrude from the lens holder 220. Accordingly, the height of the optical pickup actuator becomes higher, so that minimization of the optical pickup actuator can not be obtained.

Further, the lens holder 220 has the balance member 226. Accordingly, as the lens holder becomes heavy, the resonance frequency of the lens holder becomes low, so that the optical pickup actuator is influenced by a parasitic resonance.

SUMMARY OF THE INVENTION

In order to overcome the above problems, an optical pickup actuator for both a compact disc and a digital video disc according to the present invention includes a yoke and a lens holder. The yoke includes a shaft upwardly protruding from the bottom and a plurality of magnets mounted at a certain interval along the inner periphery surface of the yoke. The lens holder is movably connected with the yoke through the shaft, and has a plurality of winding coils at positions opposite to the plurality of magnets respectively. At least two laser openings are formed in the lens holder in parallel with a laser beam axis direction. Lens containing portions are formed on upper portions of the laser openings in order for an objective lens for the compact disc(CD) and an objective lens for the digital video disc(DVD) to be accommodated. Each of the plurality of magnets is formed in a two-body type. The plurality of magnets are constituted with a plurality of first magnets polarized in parallel with the laser beam axis direction and a plurality of second magnets polarized perpendicular to the laser beam axis direction; the first magnets and the second magnets are alternately mounted. A magnetizable material is mounted under each of the plurality of winding coils for lifting up the lens holder.

In the optical pickup actuator according to an embodiment of the present invention, the lens holder having the objective lens is lifted up and maintained in the lifted-up state by the magnets on the yoke, a magnetizable material of the lens holder, and the sliding shaft. The tracking and focusing servo are performed as the lens holder moves in the vertical direction(in the focusing direction) and in the horizontal direction(in the tracking direction) by the flux of the magnets and the amount of current supplied to the winding coils. Switching the objective lens for the CD to/from the objective lens for the DVD both of which are mounted on the lens holder is performed by controlling the amount of the tracking servo current. Accordingly, an optical pickup actuator can be obtained in a simplified structure and from a simple manufacturing process.

BRIEF DESCRIPTION OF THE DRAWINGS

These and other objects and features of the present invention can be understood through the following embodiment with reference to the accompanying drawings, in which.

DETAILED DESCRIPTION OF THE PREFERRED EMBODIMENT

An optical pickup actuator according to an embodiment of the present invention will be described in detail with reference to the accompanying drawings.

Figure 1:
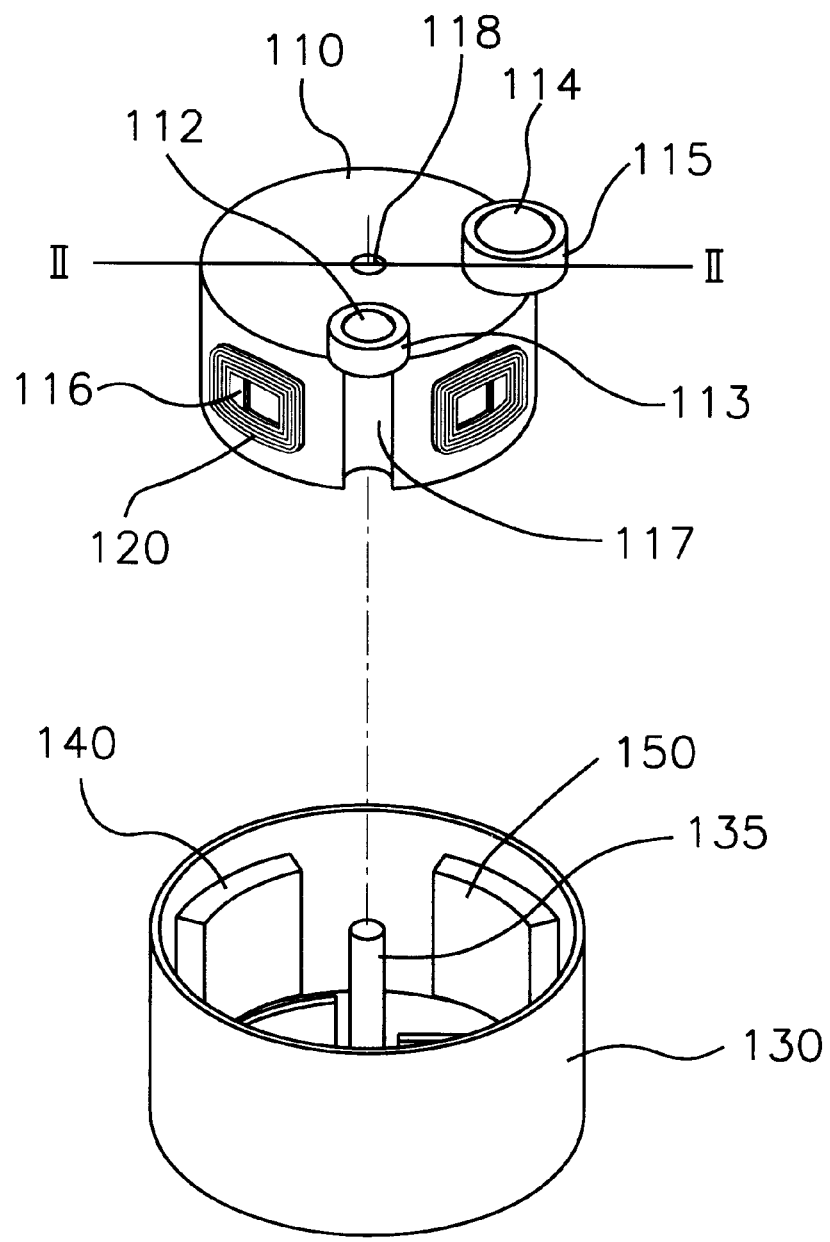
FIG. 1 is an exploded perspective view of a conventional optical pickup actuator of an axial slide type for both the CD and the DVD disc.
Figure 2:
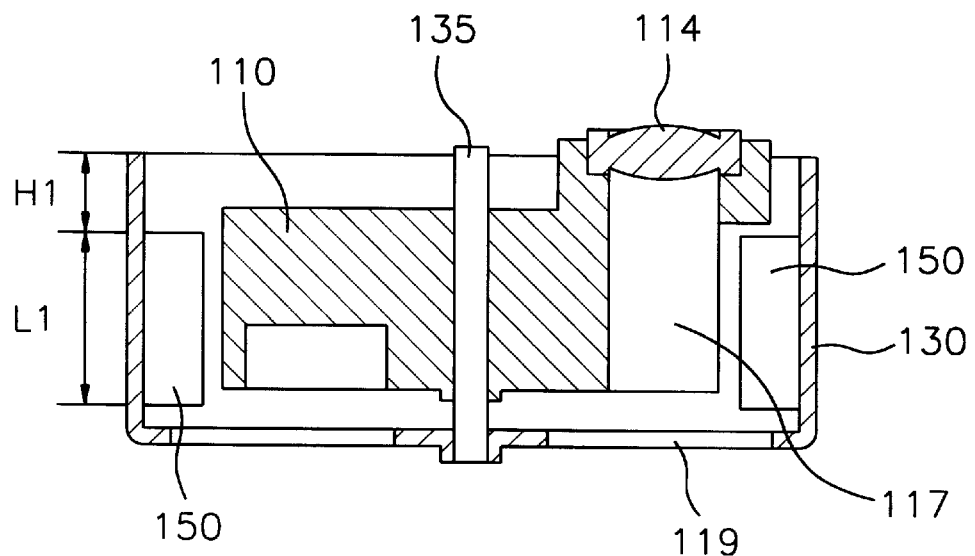
FIG. 2 is a view vertically cross-sectioned along a line II—II of FIG. 1.
Figure 3:
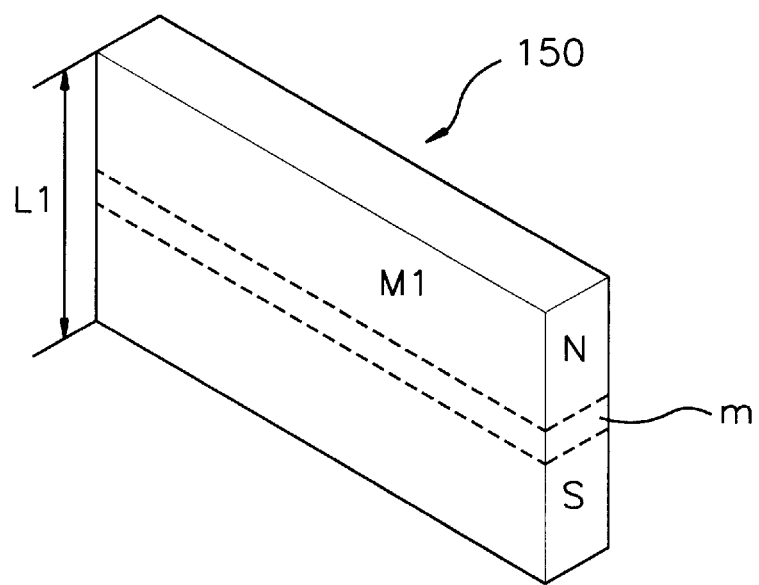
FIG. 3 is a perspective view of a magnet mounted in the conventional optical pickup actuator of an axial slide type for both the CD and the DVD of FIG. 1.
Figure 4:
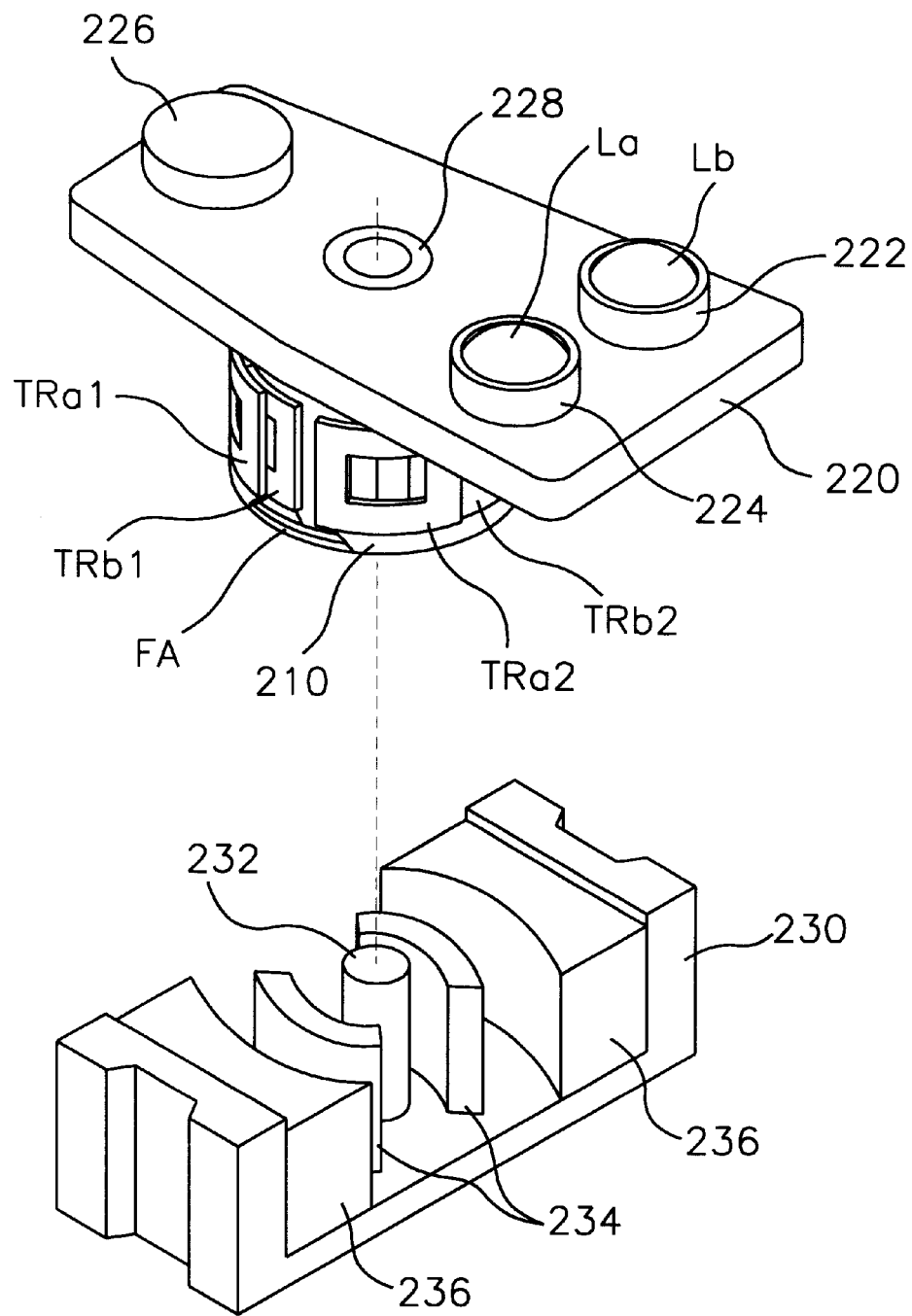
FIG. 4 is another exploded perspective view of the conventional optical pickup actuator of an axial slide type for both the CD and the DVD.
Figure 5:
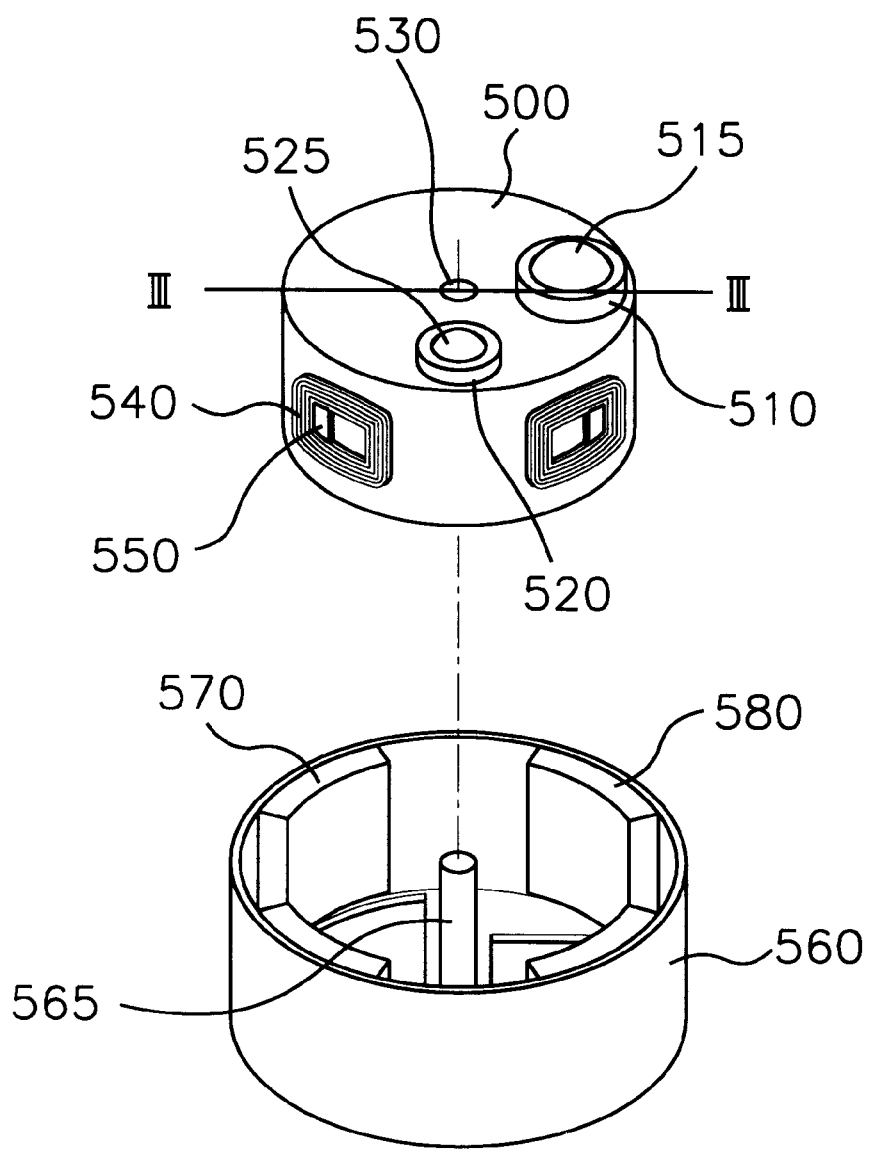
FIG. 5 is an exploded perspective view of an optical pickup actuator of an axial slide type for both the CD and the DVD according to an embodiment of the present invention.
Figure 6:
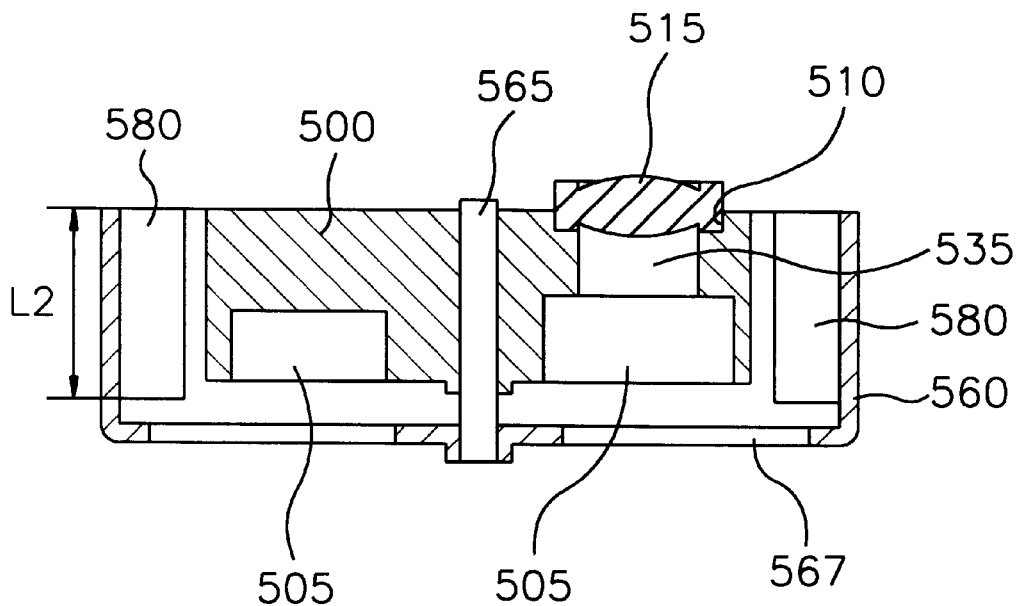
FIG. 6 is a view vertically cross-sectioned along a line III—III of FIG. 5.
Figure 7:
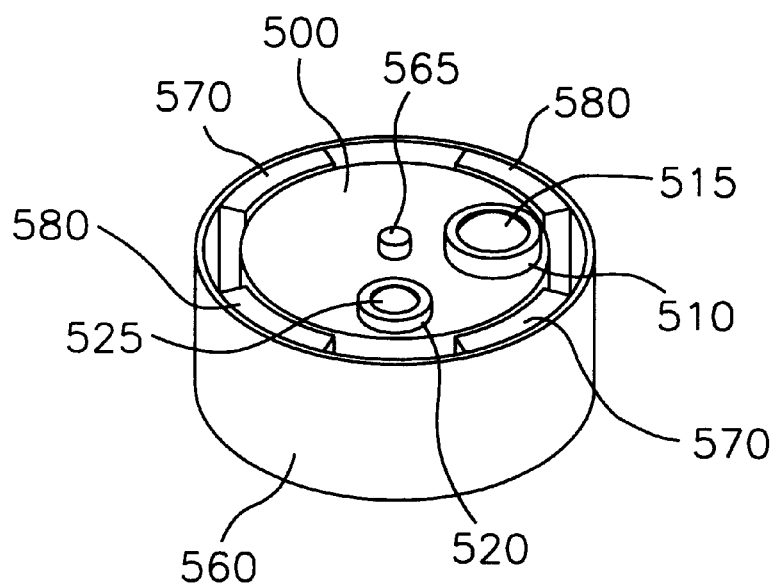
FIG. 7 is a perspective view of an optical pickup actuator of an axial slide type for both the CD and the DVD according to an embodiment of the present invention.
Figure 8:
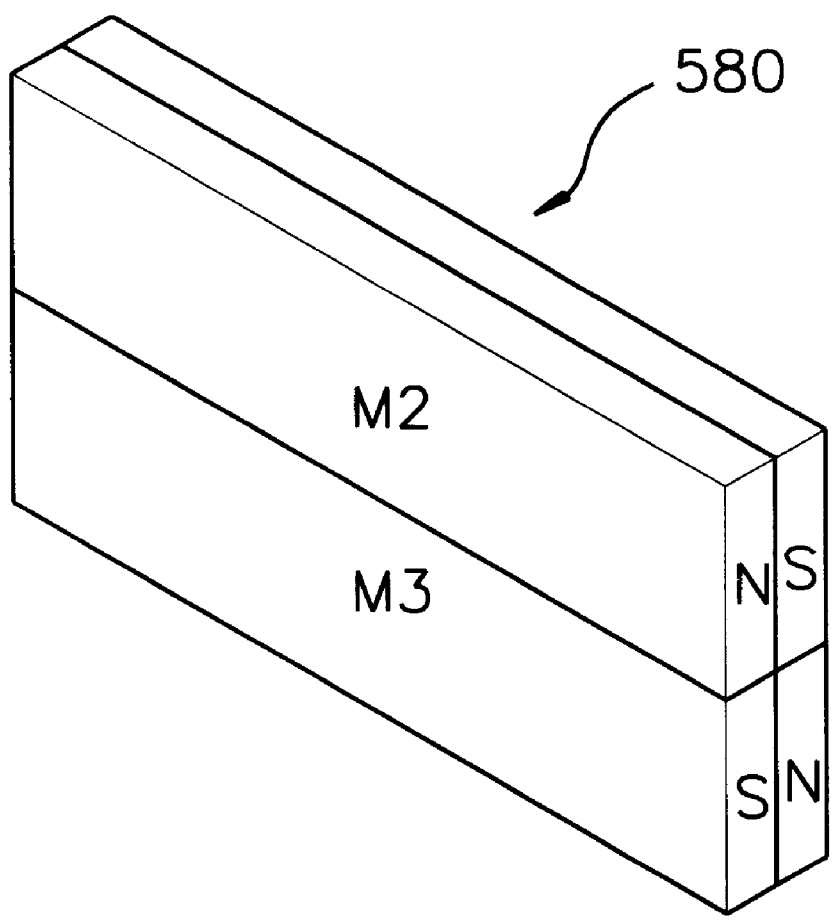
FIG. 8 is a perspective view of a two-body type magnet for an optical pickup actuator of an axial slide type for both the CD and the DVD according to an embodiment of the present invention.
Figure 9:
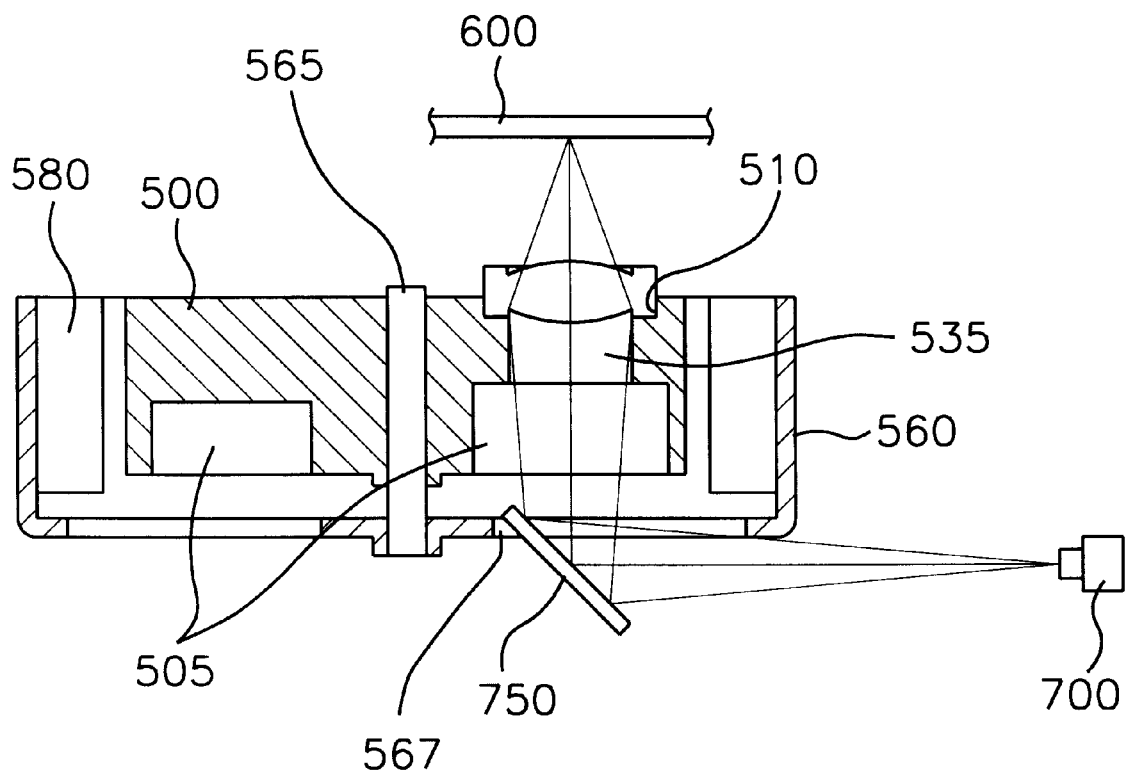
FIG. 9 is a vertically cross-sectioned view of an optical pickup actuator for both the CD and the DVD in use according to an embodiment of the present invention.
Figure 10:
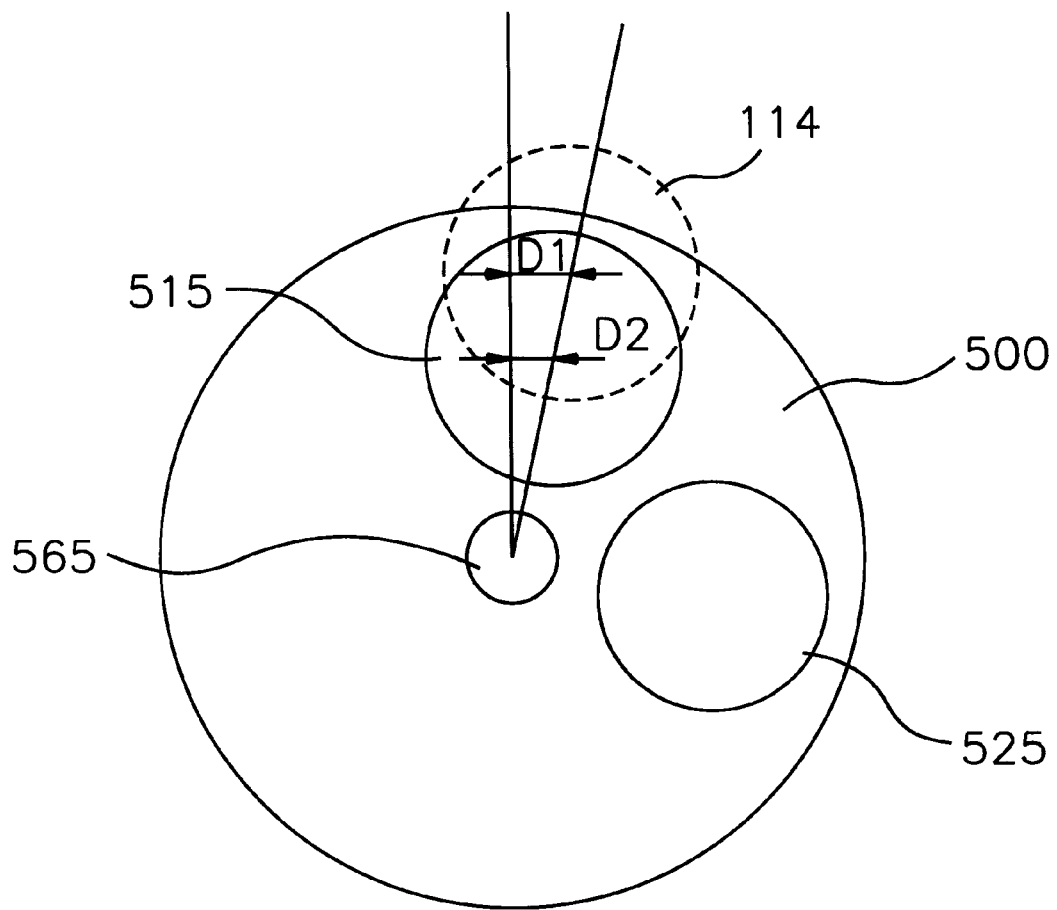
FIG. 10 is a view for showing a tracking range of an objective lens in the conventional optical pickup actuator and an optical pickup actuator according to an embodiment of the present invention.

FIG. 5 is an exploded perspective view of an optical pickup actuator of an axial slide type for both the CD and the DVD according to an embodiment of the present invention, FIG. 6 is a view vertically cross-sectioned along a line III—III of FIG. 5, FIG. 7 is a perspective view of an optical pickup actuator of an axial slide type for both the CD and the DVD according to an embodiment of the present invention, FIG. 8 is a perspective view of a two-body type magnet for an optical pickup actuator of an axial slide type for both the CD and the DVD according to an embodiment of the present invention, FIG. 9 is a vertically cross-sectioned view of an optical pickup actuator for both the CD and the DVD in use according to an embodiment of the present invention, and FIG. 10 is a view for showing a tracking range of an objective lens in the conventional optical pickup actuator and an optical pickup actuator according to an embodiment of the present invention.

A cylindrical yoke 560 has a sliding shaft 565 upwardly protruding from bottom center thereof. A through-hole 567 is formed in the bottom of the yoke 560. A first magnet pair 570 and a second magnet pair 580 are mounted in the cylindrical groove 572 formed along the periphery of the yoke 560. That is, the first and second magnet pairs 570 and 580 are attached on the inner surface of the cylindrical groove 572. The first magnet pair 570 includes two magnets disposed 180° to each other. Each magnet of the first magnet pair 570 is polarized in the perpendicular direction with respect to the sliding shaft 565. The second magnet pair 580 includes two magnets disposed 180° to each other. Each magnet of the second magnet pair 580 is polarized in the parallel direction with respect to the sliding shaft 565. The magnets of the first magnet pair 570 and the magnets of the second magnet pair 580 are alternately arranged at the 90° interval. The first and second magnet pairs 570 and 580 are attached at the same height level as the cylindrical yoke 560. A through-hole 567 is formed on the bottom of the yoke 560 through which a laser beam from a hologram element 700 passes. A full mirror 750 is mounted under the through-hole 567 in order for the laser beam to be aligned with axes of the objective lenses 515 and 525.

The magnets are manufactured in a two-body type. That is, one of the magnets is divided into two, a first magnet piece of the S pole and a second magnet piece of the N pole in order to maintain polarity arrangement of one magnet in the N pole and the S pole. The two-body magnet is formed with a first portion M2 in which the N pole of the first magnet piece is attached to the S pole of the second magnet piece and a second portion M3 in which the S pole of the first magnet piece is attached to the N pole of the second magnet piece. The two-body type magnet is formed with attachment of the first and second portions M2 and M3 as shown in FIG. 8. In case that such two-body type magnet is attached on the inner surface of the yoke 560, it is necessary to attach the magnet for an electromagnetic field of the magnet, which is intended to be used, to exclude a non-magnetizable region. For example, as shown in FIG. 8, in order to generate an electromagnetic field acting in parallel with the sliding shaft, the two-body type magnet is mounted at the border line of the first portion M2 and the second portion M3 to be arranged in parallel with the sliding shaft 565. The border line is formed as the first and second portions M2 and M3 are attached.

The lens holder 500 is formed in a cylindrical shape. The lens holder 500 has an axial hole 530 at a position corresponding to the sliding shaft 565 of the cylindrical yoke 560. Two laser openings 535 are formed on the upper surface of the lens holder 500 at positions having the same distance from the center of the axial hole 530. The laser openings 535 are spaced apart from each other. A first lens container 510 and a second lens container 520 are formed on the upper portions of the laser openings 535. An objective lens 515 for a DVD is mounted in the first lens container 510. An objective lens 525 is mounted in the second container 520. The first and second lens containers 510 and 520 each play a role of a rib for enhancing rigidity.

Four winding coils 540 are attached on the outer periphery of the lens holder 500. The first winding coil is attached on the periphery of the lens holder 500 at an acute angle formed by the objective lenses 515 and 525. The second winding coil is attached at the 180° position with respect to the first winding coil on the lens holder 500. The third winding coil and the fourth winding coil are alternatively attached at the 180° position to each other between the first and second winding coils on the periphery of the lens holder 500. That is, the first and third winding coils are arranged at the 90° position to each other and the same is applied to the second and fourth winding coils. A plurality of balance members 505 are formed in a groove shape which is a cavity upwardly formed from the bottom of the lens holder 500. The balance members 505 enable the center of the axial hole 530 to be a weight center of the lens holder 500. A magnetizable material 550 is mounted in the center portion of each of the winding coils 540 and on the periphery of the lens holder 500. A first magnetizable material mounted in the center of the first winding coil is inclined toward the objective lens 515 for the DVD. A second magnetizable material mounted in the center of the second winding coil is inclined toward the objective lens 515 for the DVD. A third magnetizable material in the center of the third winding coil is inclined far from the objective lens for the CD. The fourth magnetizable material in the center of the fourth winding coil is inclined far from the objective lens 515 for the DVD. The radius of the yoke 560 is larger than the inner radius from the sliding shaft 565 to the magnets 570 and 580. The lens holder 500 is mounted inside the yoke 560 with the axial hole 530 connected to the sliding shaft 565 of the yoke 560. At this time, one of the laser openings 535 is disposed on the upper portion of the through-hole 567, and each of the winding coils is mounted opposite to each of the magnets.

Hereinafter, the optical pickup actuator according to an embodiment of the present invention will be described in detail.

First, an assumption is made that the through-hole 567 is aligned with the objective lens 525 for the CD. The lens holder 500 is lifted up from the bottom of the yoke 560 due to an electromagnetic field between the magnets 570 and 580 and the magnetizable material 550. The ongoing direction of the laser beam from the hologram device 700 is changed by the full mirror 750. Accordingly, the laser beam travels along the axis of the objective lens for the CD 525 by passing through the through-hole 567 from below. The travel ling laser beam is focused on a pit of a track of a disc and reflected. The reflected laser beam passes through the objective lens 525 for the CD and the through-hole 567 again, and is inputted to the photodetector(not shown) in the hologram device 700 through the full mirror 750. The focusing and tracking states in the data recording pit are detected from the inputted laser beam.

In case that the focusing servo is necessary, the focusing servo current is applied to the winding coils opposite to the second magnet pair 580. In case that the focusing servo current is applied to the winding coils, a force is applied to the direction in parallel with the sliding shaft 565 due to the flux of the second magnet pair 580. Accordingly, the focusing servo is performed since the lens holder 500 having an objective lens for the CD receives a force in the direction of the sliding shaft 565.

In case that the tracking servo is necessary, the tracking servo current is applied to the winding coils opposite to the first magnet pair 570 from the servo system(not shown). In case that the tracking servo current is applied to the winding coil, a force is applied for the rotation direction of the lens holder 500 due to the flux of the first magnet pair 570. Accordingly, the lens holder 500 including the objective lens 525 for the CD performs a tracking servo by a force in a parallel direction.

In the meantime, in case of changing the positions of the objective lens 525 for the CD and the objective lens 515 for the DVD, a lot of current is instantly applied to the winding coil disposed opposite to the first magnet pair 570 employed in the tracking servo. If a lot of current flows instantly in the winding coil, the lens holder 500 is greatly rotated in the flux direction of the first magnet pair 570. The magnetizable material 550 serves the rotation of the lens holder 500 since the magnetizable material 550 is mounted to be inclined in one direction. Tracking servo distances of the conventional optical pickup actuator and the optical pickup actuator according to an embodiment of the present invention are shown in FIG. 10. Reference numeral 114 denotes a conventional objective lens for the DVD, and reference numeral 515 denotes an objective lens for the DVD according to an embodiment of the present invention. The above two objective lenses have the same tracking servo angle with respect to the sliding shaft 565, but the traveling distances for the tracking are different from each other in the distance D1 and the distance D2. That is, the traveling distance D1 for the tracking of the conventional objective lens 114 for the DVD is larger than the traveling distance D2 for the tracking of the objective lens 515 for the DVD according to an embodiment of the present invention. The difference between the traveling distances for the tracking is caused by a reduction of the distance from the center of each of objective lenses 515 and 525 to the sliding shaft 565 compared to the conventional optical pickup actuator.

As the distance from the shaft to the objective lens becomes nearer, a driving sensitivity of the tracking deteriorates. The driving sensitivity is proportional to a value of (B*L*N)/((KL)*R), wherein B denotes an electromagnetic intensity, L denotes a length of a coil, N denotes the turn number of coil winding, KL denotes a rigidity value determined by an attraction force between the magnet and the magnetizable material, and R denotes a resistance of a coil. That is, a reduction of the rigidity value is necessary in order for the deterioration of the driving sensitivity to be compensated. However, a resonance frequency of the lens holder is lowered as the rigidity value KL is decreased. In order for the optical pickup actuator for both the DVD and the CD to be normally performed in a play mode, the compensation for the deterioration of the resonance frequency must be made. The optical pickup actuator for both the DVD and the CD must have a servo bandwidth satisfying both the DVD and the CD. The servo bandwidth for the CD is 1.1 KHz, and the servo bandwidth for the DVD is 2.4 KHz. In general, in order for the optical pickup actuator to be stably operated, a technical design is required to exclude any parasitic resonance frequency in the stable bandwidth which is ten times the servo bandwidth. Accordingly, an optical pickup actuator for both the DVD and the CD according to an embodiment of the present invention has to be designed to simultaneously meet the stable bandwidth of 11 KHz for the CD and the stable bandwidth of 24 KHz for the DVD. That is, parasitic resonance frequency must be a bandwidth of higher frequency than the stable bandwidths. In order to move the parasitic resonance frequency to the higher frequency bandwidth than the stable bandwidth, the parasitic resonance frequency must be higher than the frequency of 24 KHz. The parasitic resonance frequency(fn) is proportional to (KH)/m, wherein KH denotes a rigidity value of the lens holder, and m denotes a weight of the lens holder. That is, in order for the parasitic resonance frequency to heighten the reference frequency of 24 KHz, it is essential to reduce the weight of the lens holder and to increase the rigidity value of the lens holder. In general, since the weight is proportional to the rigidity value, it is difficult to increase the parasitic resonance frequency. To solve the problem, the optical pickup actuator according to an embodiment of the present invention employs the tens holder having a structure as shown in FIG. 5, to thereby maintain the weight m of the lens holder while increasing the rigidity value KH. The reduction of the tracking driving sensitivity accordingly is compensated by increasing the intensity B of a magnet. Accordingly, the size of the lens holder is reduced, and the deterioration of the driving sensitivity is prevented.

In the optical pickup actuator according to an embodiment of the present invention, the lens holder having the objective lens is lifted up and maintained in the lifted-up state by the magnets on the yoke, a magnetizable material of the lens holder, and the sliding shaft. The tracking and focusing servo are performed as the lens holder moves in the vertical direction(in the focusing direction) and in the horizontal direction(in the tracking direction) by the flux of the magnets and the amount of current supplied to the winding coils. Switching the objective lens for the CD to/from the objective lens for the DVD both of which are mounted on the lens holder is performed by controlling the amount of the tracking servo current. Accordingly, an optical pickup actuator can be obtained in a simplified structure and from a simple manufacturing process.

By using the two-body type magnet, the height of the lens holder according to an embodiment of the present invention can be reduced by a height of a non-magnetizable region compared to the height of the lens holder of the conventional optical pickup actuator. Accordingly, the optical pickup actuator can be minimized, and the parasitic resonance frequency may be transferred to a higher frequency region since the weight of the lens holder is reduced. When the parasitic resonance frequency is transferred to a high frequency region, the operation of the optical pickup actuator becomes stable.

Further, the optical pickup actuator includes the yoke having two pairs of magnets of different polarity arrangement directions, and the winding coils of the same shape at the position corresponding to each of the magnets. Accordingly, when using the objective lens for the CD or the objective lens for the DVD, the tracking servo and focusing servo are performed according to the flux directions of the magnets.

It is understood that various other modifications will be apparent to and can be readily made by those skilled in the art without departing from the scope and spirit of this invention. Accordingly, it is not intended that the scope of the claims appended thereto be limited to the descriptions set forth herein, but rather that the claims be construed as encompassing all the features of the patentable novelty that reside in the present invention, including all the features that would be treated as equivalent thereof by those skilled in the art to which this pertains.

What is claimed is:

1. An optical pickup actuator for both a compact disc(CD) and a digital video disc(DVD), comprising:

a yoke including a shaft upwardly protruding from the bottom and a plurality of magnets formed in a two-body type mounted at a certain interval along the inner periphery surface thereof;

a lens holder movably connected with the yoke through the shaft, and having a plurality of winding coils at positions opposite to the plurality of magnets respectively, at least two laser openings formed therein in parallel with a laser beam axis direction, and lens containing portions formed on upper portions of the laser openings in order for an objective lens for the compact disc and an objective lens for the digital video disc to be accommodated.

2. The optical actuator as claimed in claim 1, wherein the plurality of magnets is constituted with a plurality of first magnets polarized in parallel with the laser beam axis direction and a plurality of second magnets polarized perpendicular to the laser beam axis direction, the first magnets and the second magnets being alternately mounted.

* * * * *